US012617004B2

(12) United States Patent
Domsohn et al.

(10) Patent No.: US 12,617,004 B2
(45) Date of Patent: May 5, 2026

(54) SYSTEM AND METHOD FOR CLEANING AN ELECTRONIC DEVICE WITH DRY ICE

(71) Applicant: Communications Test Design, Inc., West Chester, PA (US)

(72) Inventors: Jaclyn Domsohn, Downingtown, PA (US); Krithika Muthuveerappan, Exton, PA (US); Nidhin Davis, Glen Mills, PA (US); Sourish Motey, Newark, DE (US)

(73) Assignee: Communications Test Design, Inc., West Chester, PA (US)

( * ) Notice: Subject to any disclaimer, the term of this patent is extended or adjusted under 35 U.S.C. 154(b) by 45 days.

(21) Appl. No.: 18/657,131

(22) Filed: May 7, 2024

(65) Prior Publication Data

US 2025/0345830 A1 Nov. 13, 2025

Related U.S. Application Data

(63) Continuation of application No. 18/657,073, filed on May 7, 2024.

(51) Int. Cl.

| | |
|---|---|
| ***B08B 7/02*** | (2006.01) |
| ***B08B 5/02*** | (2006.01) |
| ***B08B 7/04*** | (2006.01) |
| ***B08B 15/02*** | (2006.01) |
| ***B24C 1/00*** | (2006.01) |

(52) U.S. Cl.

CPC .................. *B08B 7/02* (2013.01); *B08B 5/02* (2013.01); *B08B 7/04* (2013.01); *B08B 15/02* (2013.01); *B24C 1/003* (2013.01)

(58) Field of Classification Search

CPC .... B08B 7/02; B08B 5/02; B08B 7/04; B24C 1/003

See application file for complete search history.

(56) References Cited

U.S. PATENT DOCUMENTS

| | | | | |
|---|---|---|---|---|
| 2,479,299 A | | 8/1949 | Biggs et al. | |
| 4,707,951 A | | 11/1987 | Gibot et al. | |
| 5,405,283 A | | 4/1995 | Goenka | |
| 5,514,024 A | | 5/1996 | Goenka | |
| 5,616,067 A | | 4/1997 | Goenka | |
| 5,931,518 A | | 8/1999 | Pirker | |
| 5,944,581 A | | 8/1999 | Goenka | |
| 6,004,400 A | | 12/1999 | Bishop et al. | |
| 6,066,032 A | * | 5/2000 | Borden .................. | B24C 3/322 451/39 |

(Continued)

FOREIGN PATENT DOCUMENTS

| | | |
|---|---|---|
| CN | 206825223 U | 1/2018 |
| CN | 109396120 A | 3/2019 |

(Continued)

OTHER PUBLICATIONS

International Search Report, Issued Jul. 1, 2025.

*Primary Examiner* — Sharidan Carrillo
(74) *Attorney, Agent, or Firm* — Bradley M. Brown

(57) ABSTRACT

A system and method for cleaning an electronic device with dry ice is shown and described. The Method includes placing an electronic device in a first location to be cleaned. Applying dry ice to each side of the electronic device. Applying air to each side of the electronic device. Removing the electronic device from the first location.

14 Claims, 13 Drawing Sheets

(56) References Cited

U.S. PATENT DOCUMENTS

| | | | |
|---|---|---|---|
| 6,120,357 A | 9/2000 | Jackson et al. | |
| 7,033,249 B2 | 4/2006 | Spalteholz et al. | |
| 7,132,946 B2 * | 11/2006 | Waldner | G06K 19/0726 340/10.2 |
| 7,922,565 B2 | 4/2011 | Knisel et al. | |
| 8,292,698 B1 | 10/2012 | Shih et al. | |
| 8,725,420 B2 | 5/2014 | Boyden et al. | |
| 10,279,453 B2 | 5/2019 | Herre et al. | |
| 10,377,100 B2 | 8/2019 | Yuzer et al. | |
| 2002/0082179 A1 | 6/2002 | Okazawa et al. | |
| 2004/0018803 A1 * | 1/2004 | Boumerzoug | B24C 1/003 451/39 |
| 2010/0111841 A1 | 5/2010 | Boyden et al. | |
| 2010/0163576 A1 | 7/2010 | Boyden et al. | |
| 2013/0336749 A1 | 12/2013 | Gilchrist et al. | |
| 2014/0226136 A1 | 8/2014 | Gagnon | |
| 2016/0346923 A1 * | 12/2016 | Kesil | B25J 9/1612 |
| 2018/0056479 A1 | 3/2018 | Hu et al. | |
| 2024/0332036 A1 * | 10/2024 | Yano | H01L 21/67051 |
| 2025/0214199 A1 * | 7/2025 | Petit | B08B 7/00 |

FOREIGN PATENT DOCUMENTS

| | | | | |
|---|---|---|---|---|
| CN | 109433740 A | | 3/2019 | |
| CN | 208680048 U | | 4/2019 | |
| CN | 209189414 U | | 8/2019 | |
| CN | 209985915 U | | 1/2020 | |
| CN | 111530847 A | | 8/2020 | |
| CN | 112090865 A | | 12/2020 | |
| CN | 212664411 U | | 3/2021 | |
| CN | 113426791 A | | 9/2021 | |
| CN | 214719032 U | | 11/2021 | |
| CN | 215785397 U | | 2/2022 | |
| CN | 216175137 U | | 4/2022 | |
| CN | 17397664 U | | 9/2022 | |
| CN | 220216057 U | | 12/2023 | |
| JP | 02277236 A | | 11/1990 | |
| JP | 10137707 A | | 5/1998 | |
| KR | 20080006336 U | | 1/2008 | |
| KR | 20100126112 A | | 12/2010 | |
| KR | 20110054668 A | | 5/2011 | |
| KR | 101439312 B1 | | 9/2014 | |
| KR | 101457886 B1 | | 11/2014 | |
| KR | 20210072960 A | | 6/2021 | |
| KR | 102473797 B1 | | 12/2022 | |
| TW | M523516 | | 6/2016 | |
| WO | WO-9965803 A1 | * | 12/1999 | G03F 7/7075 |
| WO | 2023090290 A1 | | 5/2023 | |

* cited by examiner

SYSTEM AND METHOD FOR CLEANING AN ELECTRONIC DEVICE WITH DRY ICE

CROSS REFERENCE TO RELATED APPLICATIONS

This application claims the benefit of U.S. patent application Ser. No. 18/657,073 filed on May 7, 2024. The above identified patent application is herein incorporated by reference in its entirety to provide continuity of disclosure.

BACKGROUND OF THE INVENTION

Technology is always advancing and has done so at a rapid pace for the last several decades. Technology has become sophisticated, smaller, and accessible across the globe. This has led to technology becoming integral in everyday life. As with any integral element of life, the demand for technology is high. This high demand has led to a rise in the cost of technological devices.

In addition to high demand, even the simple replacement of devices can be expensive. If one merely discards older equipment or equipment with minor defects for a brand-new piece, the cost can escalate quickly. If, however, technology is upgraded or repaired this process can be much more cost effective for both the company and consumer.

Even if a user of an electronic device keeps it in good condition minor blemishes may occur. For example, dust may enter one of the ports of the device. Further, in order for a device to be resold, it must be returned as closely to the new condition as possible. The process of removing scratches or applying a fresh coat of paint may leave some surfaces in need of cleaning. Cleaning electronics with liquids may be undesirable because liquids could damage the device. Further, liquids can be difficult to manage and would require specialized draining equipment to be in place for the machine to operate.

Many companies have been taking advantage of the repair instead of discard philosophy. Further, many consumers are happy purchasing a lightly used and repaired device instead of a brand-new one. However, the process of properly cleaning and restoring a device is wrought with constant challenges. Consequently, there is always a need for an improvement in the art.

SUMMARY OF THE INVENTION

The present disclosure provides for a system and method for cleaning an electronic device with dry ice. The present disclosure provides a solution to a problem in the industry while significantly diverging from the present prior arts. The system for cleaning an electronic device with dry ice includes a first chamber, having a frame and a plurality of sides. At least one of the sides comprises an opening to allow access to an interior of the first chamber. The system includes a first electronic device location within the first chamber for placement of the electronic device. A robot arm is configured to pick up the electronic device from the first electronic device location and move the electronic device within the first chamber to be cleaned by a flow of dry ice. A dry ice machine provides the flow of dry ice for cleaning at least one surface of the electronic device.

Another object of the present invention is to have a second electronic device location within the first chamber for placement of the electronic device after it has been cleaned by the flow of dry ice.

Another object of the present invention is to have at least one door. The door is part of at least one of the plurality of sides which least partially opens allowing access to the interior of the first chamber.

Another object of the present invention is to have the dry ice machine comprise a hopper that accepts dry ice, the dry ice machine sizes the dry ice into a desired particle size and controls particle flow.

Another object of the present invention is to have the particle flow rate determined by airflow and particle amount.

Another object of the present invention is to have the first electronic device location be one a first conveyor.

Another object of the present invention is to have the second electronic device location be one a second conveyor.

Another object of the present invention is to have at least one pneumatic actuator positioned about the second device location such that the pneumatic actuator secures the electronic device.

Another object of the present invention is to have the robot arm configured to accept at least one removable tool head.

Another object of the present invention is to have a first tool head. The first tool head is configured to pick up the electronic device.

Another object of the present invention is to have a second tool head. The second tool head is configured to contain a nozzle in fluid connection with the dry ice machine such that the flow of dry ice exits the nozzle.

Another object of the present invention is to have at least one tool head mount. The at least one tool head mount is configured to removably secure a removable head thereto.

Another object of the present invention is to have at least one door sensor. The system shuts off when the at least one door sensor senses the door is open. Another object of the present invention is to have an exhaust fan to vent $CO_2$ gasses from the first chamber.

Another object of the present invention is to have the dry ice machine located within a second chamber.

Another object of the present invention is to have an interior of the second chamber lined with noise reduction material.

Another object of the present invention is to have at least one input device. The input device is configured to scan the electronic device into a tracking system.

Another object of the present invention is to have at least one camera. The at least one camera is positioned over the first electronic device location.

Another object of the present invention is to have at least one printing device.

Other objects, features and advantages of the present invention will become apparent from the following detailed description taken in conjunction with the accompanying drawings.

BRIEF DESCRIPTION OF THE DRAWINGS

The accompanying drawings are incorporated into and are to be considered part of the present specification. These drawings are meant to aid the reader's understanding and comprehension of the present disclosure and are depictions of various example embodiments. The drawings are not to be considered limiting upon the disclosure. It should specifically be noted that the drawings are examples and may not necessarily be drawn to scale.

DETAILED DESCRIPTION OF THE INVENTION

For the purposes of presenting a brief and clear description of the present invention, a preferred embodiment will be discussed as used for the system and method for cleaning an electronic device with dry ice. The figures are intended for representative purposes only and should not be considered to be limiting in any respect.

Figure 1:
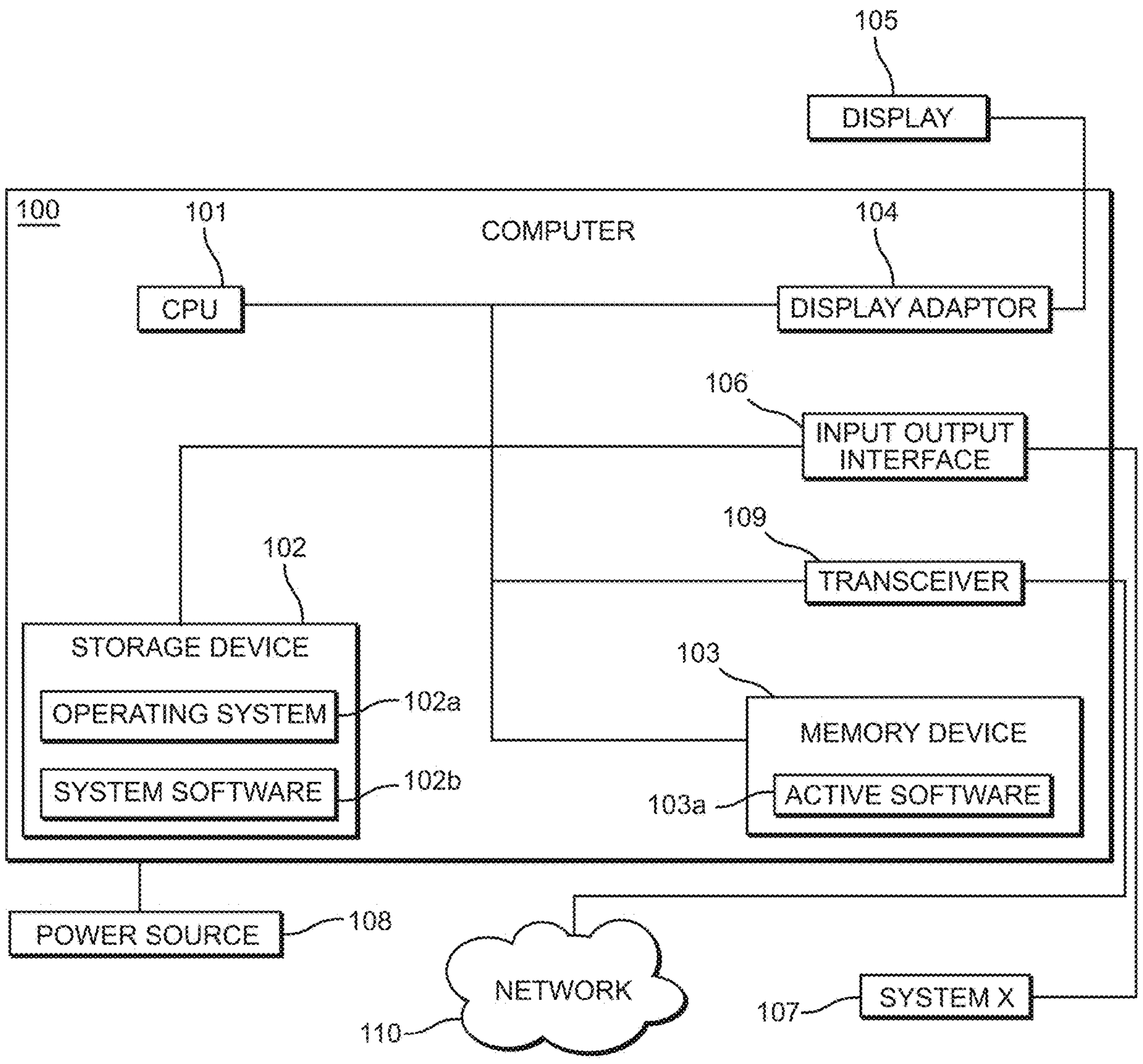
FIG. 1 shows a block diagram of a computing system.

Referring now to FIG. 1, there is shown a block diagram of a computing system. Computing systems may have many interchangeable parts or multiples of some parts. One of ordinary skill in the art will understand that the shown computer 100 is a basic computing system demonstrating a minimal amount of parts to allow for the computer to function. Computer 100 is exemplary, and one of ordinary skill in the art will recognize that computer 100 may be altered as necessary to render the presently disclosed system operable or to provide a peak performance of the disclosed system.

The parts described are each operably coupled together as necessary, one of ordinary skill in the art will understand how to connect general computer components, for example by use of a mother board or other computer board. In the shown embodiment the computer 100 includes a CPU 101. In one embodiment the CPU 101 includes only one processor. In other embodiments the CPU 101 may be made up of multiple processors. Different processors will allow for different computing power and speed.

The computer 100 includes at least one storage device 102. In different embodiments the at least one storage device 102 may be a solid-state storage device, a disk storage device, or another suitable storage device. One of ordinary skill in the art will recognize that there are several types of computing storage devices each providing well-known benefits and drawbacks. The at least one storage device 102 will store at least the computer operating system 102*a* and system software 102*b*. System software 102*b* may include any software necessary, or optionally, used to run any system described herein.

The computer 100 will have at least one memory device 103. One of ordinary skill in the art will recognize that there are several types of computing memory devices each providing well known benefits and drawbacks. The at least one memory device 103 will store at any active software 103*a*. Active software 103*a* may include the operating system 102*a* or parts of the system software 102*b*. The at least one memory device 103 may store the entire system software 102*b* size and speed permitting.

The computer 100 may also include various connection ports and types. The computer 100 may have a display adaptor 104. The display adaptor 104 will allow the computer 100 to connect to at least one display 105. In other embodiments multiple displays may be connected to the display adaptor 104. Similarly, the computer 100 may include at least one input/output interface 106. The input/output interface 106 will allow the computer 100 to connect to at least one system, referred to as System X 107 in FIG. 1. The input/output interface 106 may also allow for connection to only part of System X 107 or multiple systems. The computer 100 will also be operably connected to a required power source 108.

The computer 100 may also include a transceiver 109. In one embodiment the transceiver 109 is a wired transceiver. In another embodiment the transceiver 109 is a wireless transceiver. The transceiver 109 will allow the computer 100 to connect to a network 110. The network 110 may be an internet or an intranet connection. The network 110 will allow for the computer 100 to potentially connect to multiple other computing devices. In another embodiment the network may allow for the computer 100 to connect to multiple systems. In one embodiment the computer 100 will allow for System X 107 to be connected to the network 110.

Figure 2B:
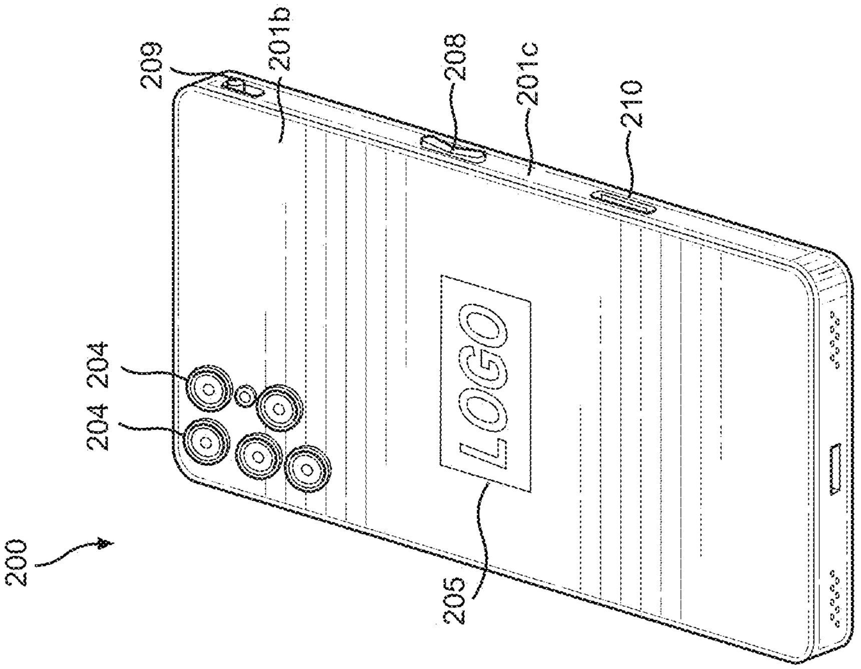
FIG. 2B shows a rear view of an example of an electronic device.
Figure 2A:
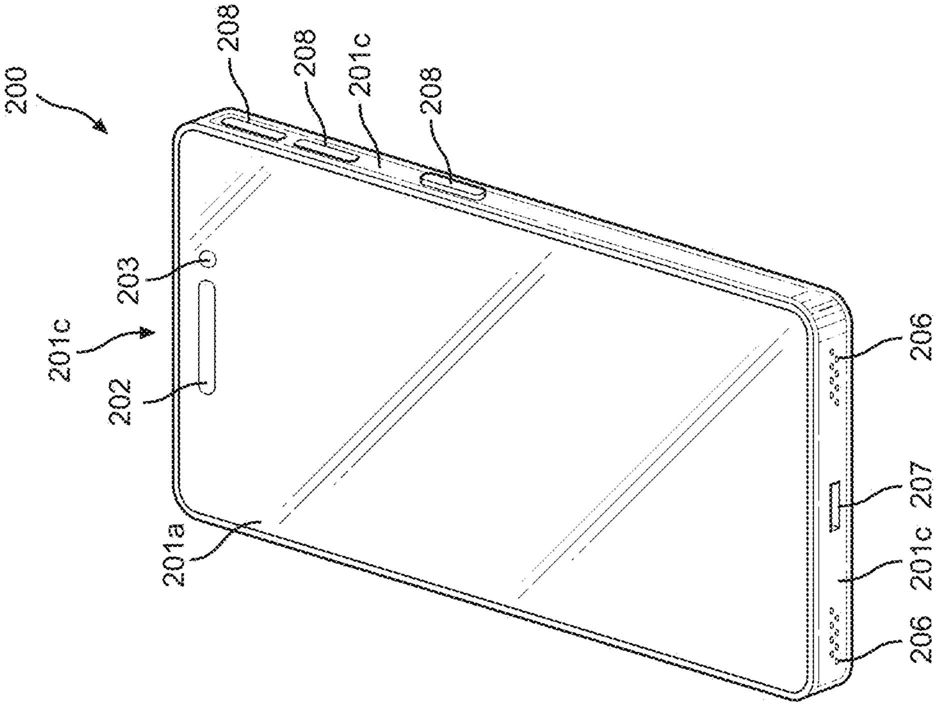
FIG. 2A shows a front view of an example of an electronic device, such as a mobile phone device.

Referring now to FIG. 2A and FIG. 2B, there is shown a front view and a rear view of an example of an electronic device 200, such as a mobile phone device. Electronic devices may have many different parts and components. Even like parts or components may be in various locations or have different shapes and sizes. One of ordinary skill in the art will understand that the shown electronic device 200 is merely an example of the exterior of a device. Any specialized or specific features or requirements of devices will be detailed herein as necessary. However, one of ordinary skill in the art will understand that many electronic devices 200 have many of these described characteristics. Further, electronic devices, such as mobile phone devices, operate on a computer-based platform having many of the computer parts as described in FIG. 1. The below description seeks to detail external components and not the computer which runs the electronic device 200. The electronic device 200 can be, without limitation, a mobile phone device, or a tablet. In one embodiment other electronic devices may be used such as laptops, cable set top boxes, routers, or antennas.

The shown electronic device 200 includes a front surface 201*a*, a rear surface 201*b*, and four side surfaces 201*c*. The front surface 201*a* typically includes a screen which covers a majority of the surface. The screen is typically covered with a specialized material, currently a glass product. The front surface 201*a* may also include a speaker opening 202 and a camera opening 203.

The rear surface 201*b* of the electronic device 200 may include at least one camera lens 204. In the shown embodiment there are a plurality of camera lenses 204. In another embodiment at least one light lens is secured to the rear surface 201*b*. In many embodiments the rear surface 201*b* includes a logo 205. The logo 205 may represent the company which created the electronic device 200. The rear surface 201*b* may include a coating or covering to decorate or protect the rear surface. For example, a coating may be applied to the rear surface 201*b* to ensure a shiny surface.

The side surfaces 201*c* of the electronic device 200 may include any or all of the following parts. In one embodiment the electronic device 200 will have several openings for speaker output 206. The electronic device 200 will also include a charging port 207. Charging ports 207 may include a prong therein to secure to a charging cord. An electronic device 200 may include a plurality of buttons 208 along the side surfaces 201*c*. In different embodiments the plurality of buttons 208 may allow for volume control, locking the electronic device 200, or other desired functions. In some embodiments the electronic device 200 may include a switch 209. In yet another embodiment the electronic device 200 includes a SIM card slot or other card slot 210.

Figure 3:
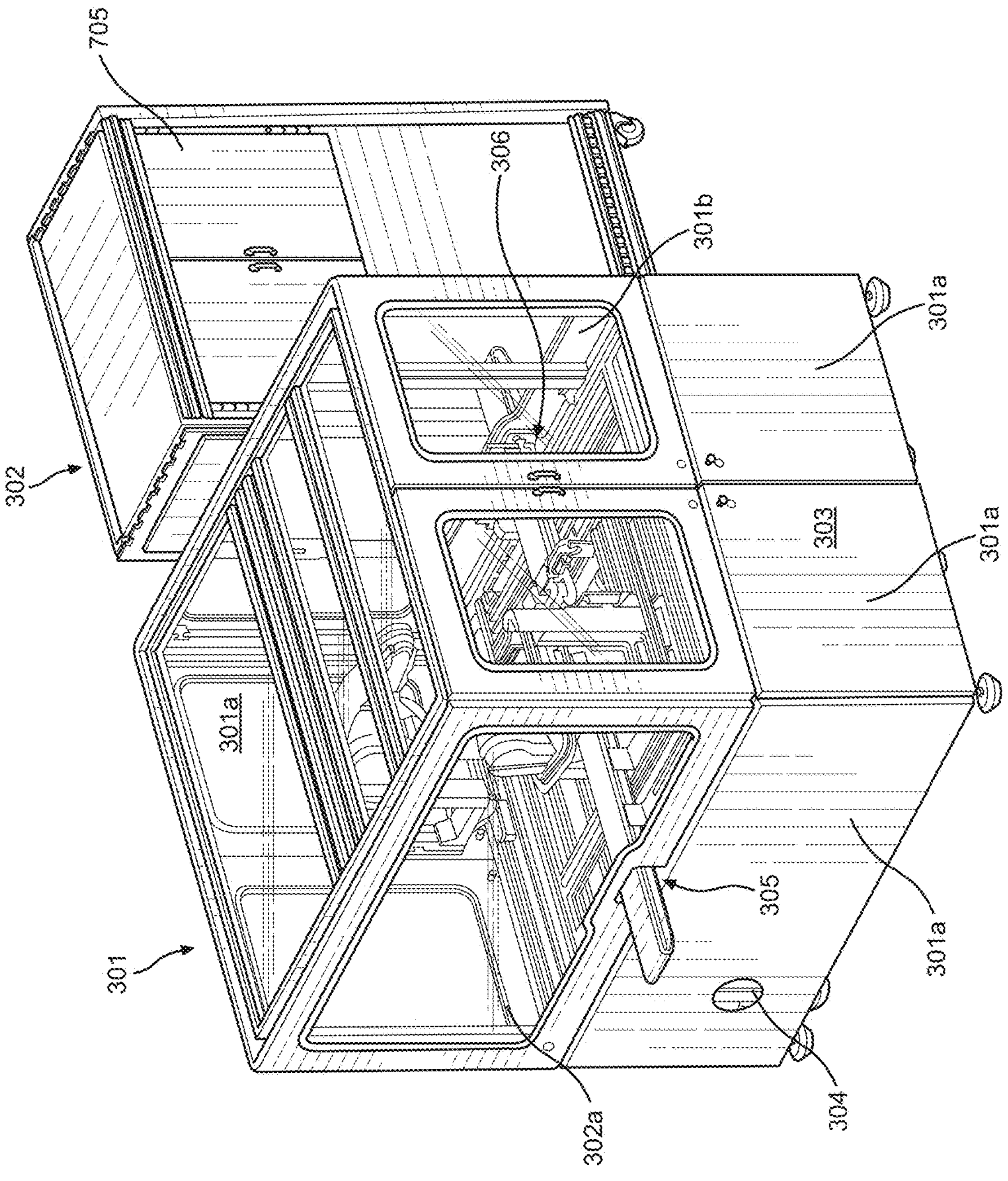
FIG. 3 shows a perspective view of an embodiment of a system for cleaning an electronic device with dry ice.

Referring now to FIG. 3, there is shown a perspective view of an embodiment of the system for cleaning an electronic device with dry ice. In the present embodiment the system includes two distinct chambers. A first chamber 301 houses a majority of the system and the components for cleaning devices. A second chamber 302 houses a dry ice machine/blaster 701 as will be described herein. One of ordinary skill in the art will understand that the first chamber 301 and the second chamber 302 may be combined into a single larger chamber. In this embodiment each and every component of the system will still function as described herein with only slight modifications due to the positioning of the components.

In the shown embodiment the first chamber 301 is a fully enclosed chamber. The first chamber 301 is made up of various non-transparent sections 301*a* and transparent sections 301*b*. The transparent sections 301*b* allow an individual to see the inner workings of the system without the need to enter the first chamber 301.

The first chamber 301 will have at least one door 303 which allows access to the interior of the chamber. In the present embodiment there are two sets of doors 303. In one embodiment the first chamber 301 has at least one vent port 304. The vent port will allow $CO_2$ or other gases to be vented from the interior of the first chamber 301.

The first chamber 301 further includes at least one entrance slot 305. The entrance slot 305 allows for a desired device to enter the first chamber 301 for cleaning. In the current disclosure the electronic device 200 is represented by a mobile phone device. However, with only minor changes in size the system for cleaning an electronic device with dry ice can be used to clean any manner of device. The first chamber 301 also has at least one exit slot 306. The exit slot 306 will allow for a desired device to exit the first chamber 301.

While not shown in the current FIG. the first chamber 301 may also include any number of entrance or exit ports to allow for necessary hoses, cables, or wires to enter or exit the first chamber 301. In some embodiments the port has a gromet placed therein. The gromet will allow for a slightly sealed opening. This seal will better contain $CO_2$ gases such that the gas can be vented as desired.

In the embodiment where there is a second chamber 302, the second chamber 302 is positioned at an operable distance from the first chamber 301. In the shown embodiment the second chamber 302 is positioned directly adjacent to the first chamber 301. However, one of ordinary skill in the art will understand that with the appropriate lengths of wire, hoses, and other necessary components, the second chamber 302 may be placed at various locations and still be operable. In the shown embodiment the second chamber 302 has at least one door 705. The at least one door 705 will allow access to the interior of the second chamber 302.

While not shown in this FIG. 3, one of skill in the art will recognize that the second chamber 302 may also include any number of entrance or exit ports to allow for necessary hoses, cables, or wires to enter or exit the second chamber 302. In some embodiments the port has a gromet placed therein. The gromet will allow for a slightly sealed opening.

Figure 4:
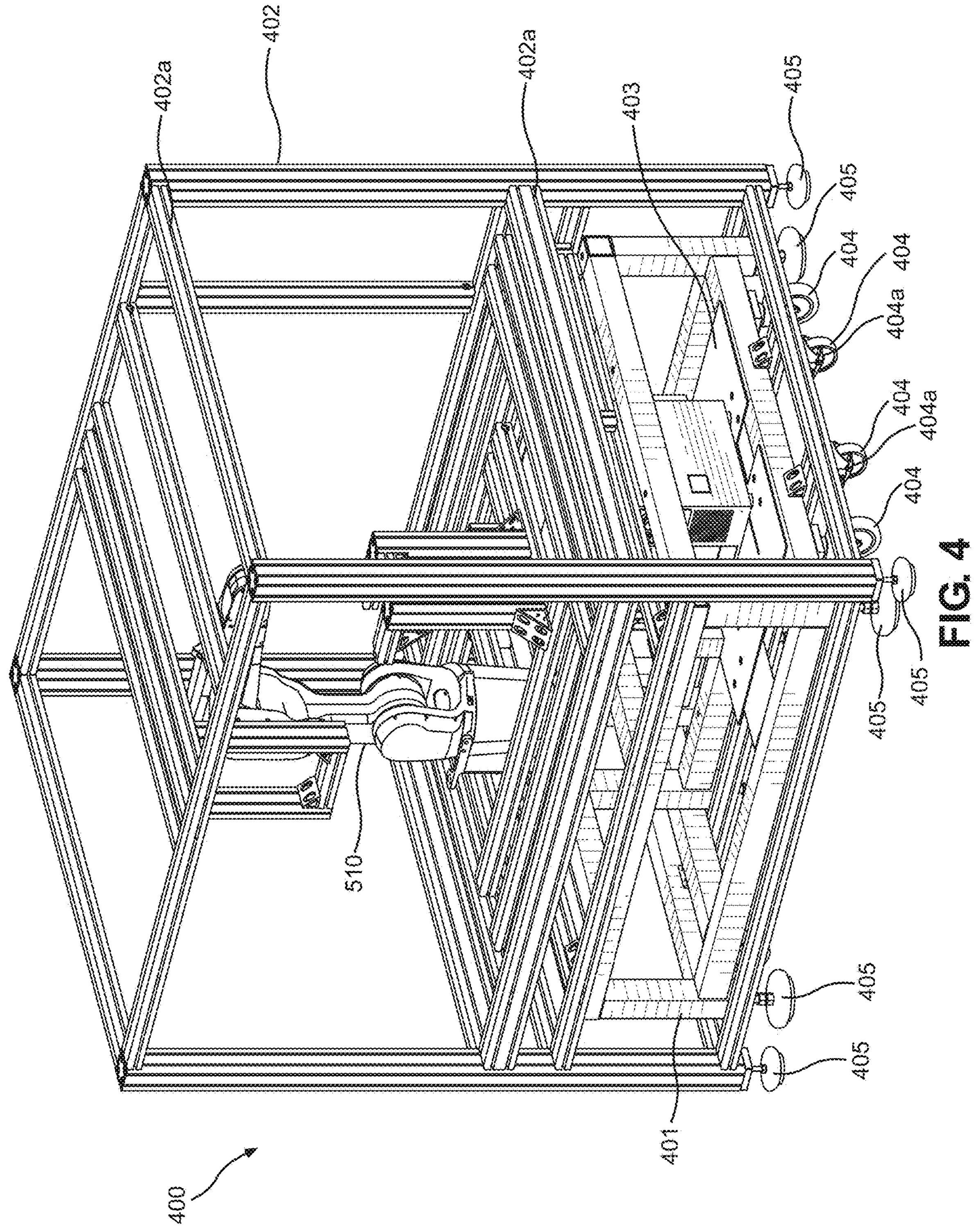
FIG. 4 shows a perspective view of an embodiment of a frame which is positioned inside a first chamber of the system for cleaning an electronic device.

Referring now to FIG. 4, there is shown a perspective view of an embodiment of a frame which is positioned inside the first chamber 301. The frame as demonstrated in FIG. 4 is an example of one such configuration for the frame 400 and the framing material which will allow for the function of the present system. One of ordinary skill in the art will understand that many different frame configurations will allow for the desired function of the system. At a minimum, the frame 400 will support the necessary system components. In some embodiments, where the first chamber 301 is enclosed, the frame 400 will also support the walls and doors of the enclosure.

In the shown embodiment the frame 400 of FIG. 4 is made of several different types of materials. A first material 401 is a more robust material. In one embodiment the first material 401 can be used to create the entire frame. In the shown embodiment the first material 401 is used to create a portion of the frame 400 which will support a robot arm 510. The robot arm 510 will be discussed in detail in FIG. 5. In one embodiment the first material 401 is square steel, however, other suitable materials may be used.

In some embodiments the frame 400 also includes a second material 402. In one embodiment the second material 402 is aluminum. Specifically, in one embodiment T-slotted aluminum extruded profiles can be used. The use of the second material 402 will allow for the frame 400 to be much lighter and more mobile than if the entire frame 400 was made from the first material 401. In one embodiment the second material 402 has slots 402*a* therein. In one embodiment T-slots are used. The slots will allow for connection of brackets or system components, as described in FIG. 5.

In one embodiment at least one plate 403 is secured to the frame 400. In different embodiments the at least one plate 403 is used to support system components as described herein. In some embodiments the frame 400 includes a plurality of wheels 404. The wheels 404 will allow for the first chamber 301 to be moved by rolling. Without the wheels 404 the first chamber 301 could be of a size and weight that requires machinery to move. In one embodiment the wheels 404 include wheel locks 404*a*. The wheel locks 404*a* can be used to prevent the first chamber 301 from rolling unwantedly.

In another embodiment the frame 400 includes a plurality of feet 405. In one embodiment there are four feet 405, one located at each corner of the frame 400. In another embodiment there are additional feet 405 used to provide additional stabilization to the robot arm 510. In one embodiment the feet 405 have an adjustable height. This will allow for the feet 405 to be risen and/or lowered to provide support to the frame 400. In yet another embodiment different types of feet 405 may be used to provide different levels of support to the frame 400.

Figure 5:
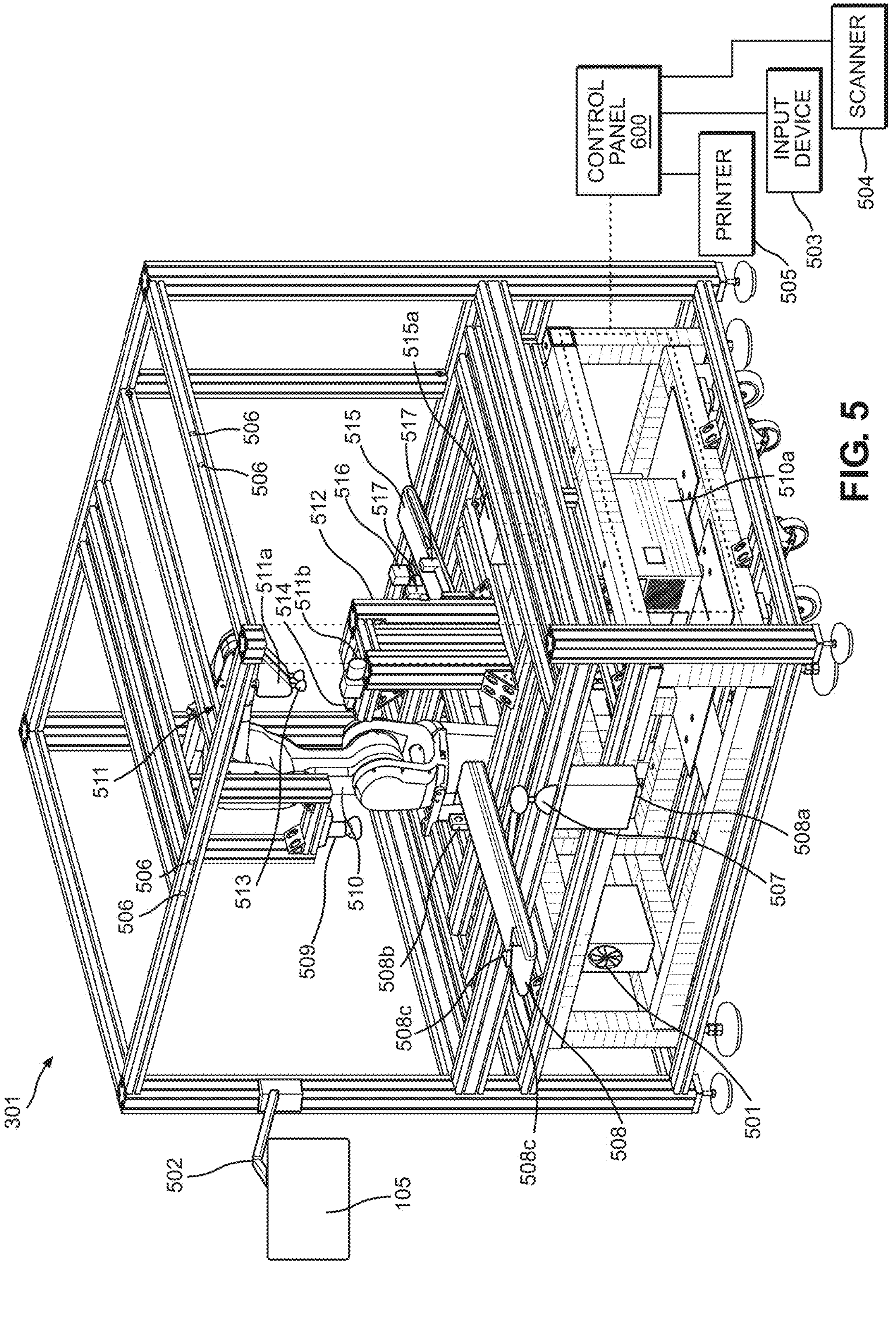
FIG. 5 shows a perspective view of an embodiment of the components located within the first chamber for the system for cleaning an electronic device with dry ice

Referring now to FIG. 5, there is shown a perspective view of an embodiment of the components located within the first chamber 301 for the system for cleaning an electronic device with dry ice. The first chamber 301 houses at least one exhaust fan 501. In this embodiment the exhaust fan 501 is shown in a lower corner of the first chamber 301. The exhaust fan 501 will allow for the $CO_2$ to be vented from the first chamber 301 as the dry ice transitions back to its gaseous state. $CO_2$ in large concentrations, especially at the cold temperatures is heavier than the remaining atmosphere of the first chamber 301. Therefore, the exhaust fan 501 will be most efficient if located in a lower position of the first chamber 301 relative to the top of the first chamber 301.

The system may include a display 105 which is operably coupled with the computer 100. The display 105 will be capable of showing various outputs including, for example, dry ice particle size, dry ice flow rate, electronic device type, system run time and device identification. Other items may also be shown via the display 105 as needed. In one embodiment the display 105 is secured directly to the first chamber 301. In one embodiment a mounting bracket 502 is used to allow the display 105 to be movable.

A first input device 503 is operably coupled to the computer 100. In one embodiment the first input device 503 is a keyboard. The first input device 503 will allow a user to control the system and make modifications to various system parameters. In one embodiment the first input device 503, the display 105 and the computer 100 allow for a user to change dry ice parameters without directly changing the parameters on the dry ice system.

In some embodiments the system includes a second input device 504 operably coupled to the computer. In the shown embodiment the second input device 504 is a bar code scanner. In one embodiment an electronic device will have a bar code associated with the device. By using the second input device 504 the electronic device can be scanned into the system. This will allow for the electronic device to be tracked.

In yet a further embodiment a printer 505 is operably coupled to the computer. In some embodiments the bar code is associated with the electronic device by way of a printed sticker displaying the bar code. When the dry ice cleaning is applied at least the barcode ink will be blasted away. In most embodiments the entire sticker will be removed from the electronic device. Therefore, in these embodiments the printer 505 can be used to print a new barcode stick which can be reapplied to the electronic device.

Dry ice blasting can be harmful to a user in some instances. For example, an ice particle could bounce and hit a user. The first chamber 301 includes sidewalls in order to minimize this. However, the first chamber also includes doors. In an effort to add further safety features in some embodiments door sensors 506 are mounted to the doors. The door sensors 506 are operably coupled to the computer. In one embodiment the door sensors 506 will automatically shut down the dry ice blasting should any of the doors be opened. In another embodiment the door sensors 506 will shut down the entire machine should any one of the doors be opened.

In addition to the door sensors 506, in some embodiments the system includes at least one shutoff button 507. In the shown embodiment there at two shutoff buttons 507 shown. The shutoff button 507 is operably coupled to the computer. When the shutoff button 507 is pressed the entire system will shut down. This shutoff button 507 can be used as an emergency shutoff button.

In the shown embodiment a control panel 600 is shown secured in the lower front of the first chamber 301. The control panel 600 will be discussed at length in the description of FIG. 6. The control panel 600 will hold various components of the system.

The system includes a first conveyor 508. In one embodiment the first conveyor 508 is a "dirty conveyor." This means that the dirty, pre-cleaned, electronic device will be placed thereon. The first conveyor 508 will take an electronic device into the first chamber 301. In one embodiment the first conveyor 508 includes a device positioner 508*c*. The device positioner 508*c* will help to place an electronic device in a proper direction and in the middle of the first conveyor 508. In one embodiment the device positioner 508*c* has angled walls which will allow for an electronic device to be turned into a desired position as it moves into the first chamber 301.

The first conveyor 508 is operably coupled to a first conveyor controller 508*a*. The first conveyor controller 508*a* is operably coupled to the computer and to a first conveyor sensor 508*b*. The first conveyor sensor 508*b* is configured to determine when the first conveyor 508 has taken an electronic device to a desired location within the first chamber 301.

In one embodiment a camera 509 is positioned over the first conveyer 508. In this embodiment the camera 509 is configured to take at least one picture of an electronic device which has been placed on the first conveyor 508. Using the picture the system can confirm the device ID by determining the type of device. In another embodiment the type of device can be used to alter the cleaning pattern. In this embodiment different patterns may be used to ensure each device is properly cleaned.

The system will include a robot arm 510. In one embodiment the robot arm 510 is a model ABB IRD 1200. In other embodiments other robot arms 510 may be used. The robot arm 510 is capable of having interchangeable tool heads 511 and have several joints capable of rotations. The robot arm 510 is connected to a robot arm controller 510*a*. The robot arm controller 510*a* is configured to control the particular model of robot arm 510 selected for use with the system. The robot arm controller 510*a* is operably coupled with the computer. The computer will send information to the robot arm controller 510*a* such that the robot arm 510 will perform the desired motions at the desired time.

In one embodiment the interchangeable tool heads 511 include a first tool head 511*a* and a second tool head 511*b*. In one embodiment the interchangeable tool heads 511 are placed in tool head mounts 512. In one embodiment the first tool head 511*a* includes a suction cup device 513. In one embodiment the suction cup 513 is fluidly coupled to a vacuum which will ensure that an electronic device can be secured to the suction cup 513 during cleaning.

In one embodiment the second tool head 511*b* includes a nozzle 514 which will deploy the dry ice media. The nozzle 514 is fluidly connected to the dry ice machine 701. In one embodiment the second tool head 511*b* is removably secured to the tool head mount 512 such that the nozzle 514 is in a position which will allow for the robot arm 510 to move the electronic device in front of the nozzle 514 for cleaning. At the same time, the nozzle 514 will be secured to the second tool head 511*b* such that, when the second tool head 511*b* is secured to the robot arm 510, the dry ice media can be sprayed onto a stationary electronic device.

In some embodiments the system includes a second conveyor 515. In one embodiment the second conveyor 515 is the "clean" conveyor. This means that the cleaned electronic device is placed on the second conveyor 515. The second conveyor 515 is operably coupled to a second conveyor controller 515*a*. The second conveyor controller 515*a* is operably coupled to the computer. In one embodiment the computer is operably coupled to a second conveyor sensor 516. The second conveyor sensor 516 will determine when an electronic device has been placed on the second conveyor 515.

An electronic device can be placed on the second conveyor 515 for exiting the first chamber 301. In one embodiment a final surface of the electronic device (the one which the vacuum was attached to) will need to be cleaned. When the electronic device is placed on the second conveyor 515, the robot arm 510 can then change tool heads and use the second tool head 511*b* to clean the final surface of the electronic device. In one embodiment the second conveyor sensor 516 is operably coupled with an actuator 517. The actuator 517 can be used to secure the electronic device in place for cleaning.

Figure 6:
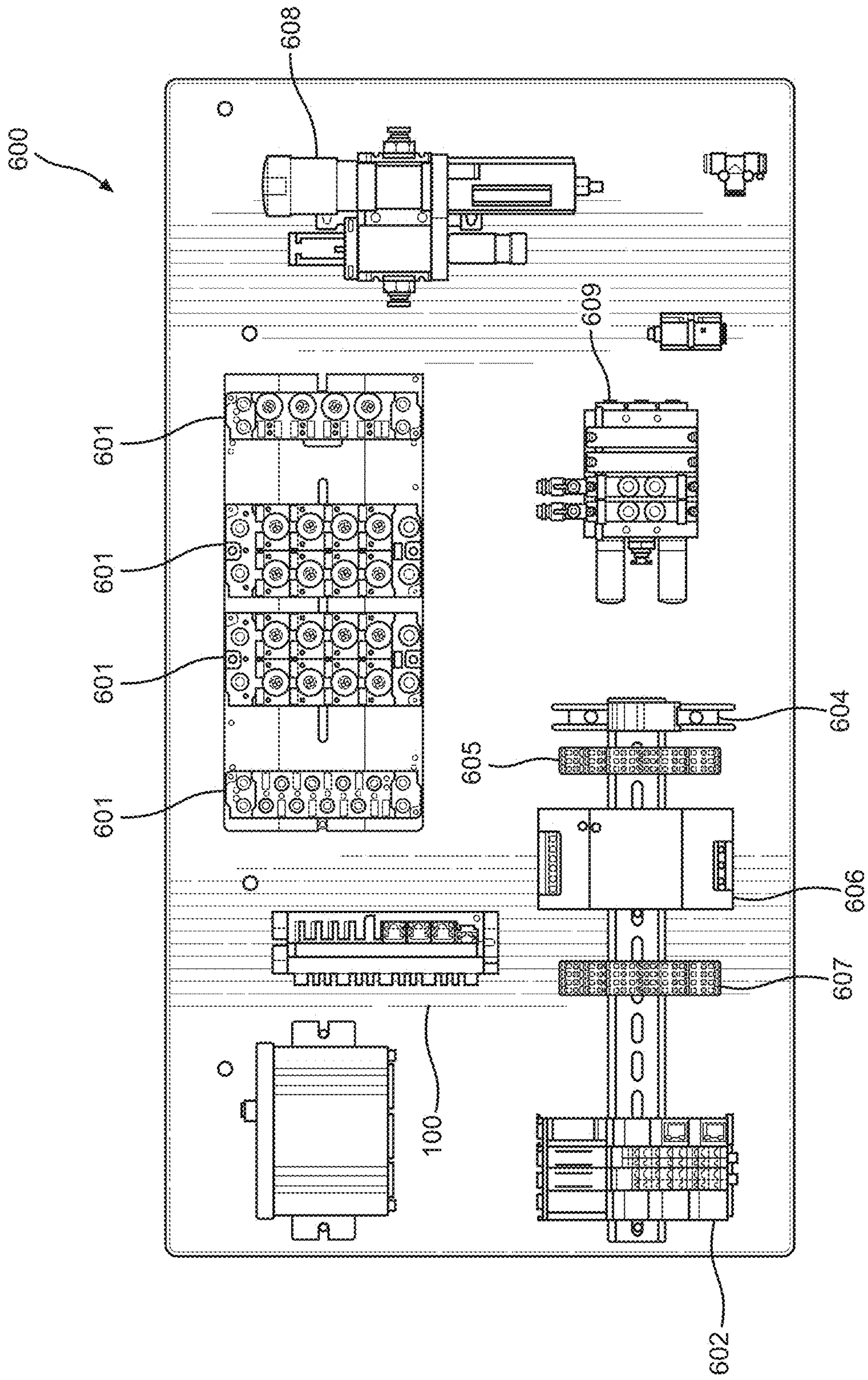
FIG. 6 shows a top-down view of an embodiment of a control panel for the system for cleaning an electronic device with dry ice.

Referring now to FIG. 6, there is shown a top-down view of an embodiment of the control panel for the system for cleaning an electronic device with dry ice. In the shown embodiment the control panel 600 includes at least some of the primary circuitry for the system for cleaning an electronic device with dry ice. In the shown embodiment the control panel includes a computer 100, which contains at least the processor and several ports. The control panel 600 also includes a plurality of etherCAT boxes 601. The etherCAT boxes 601 will facilitate the necessary connections for the system to properly function. In some embodiments the control panel 600 also includes an etherCAT gateway 602. The etherCAT gateway 602 will facilitate additional connections. In the shown embodiment the etherCAT gateway 602 is used to connect the safety shutoff systems to the system. In one embodiment a separate network adaptor 603 is included on the control panel 600.

In this embodiment the control panel 600 includes several electrical components to supply power to the control panel components. In the shown embodiment there is a circuit breaker 604 placed first in the line of power supply components. The circuit breaker 604 leads to a first power terminal 605. The first power terminal 605 connects to a power supply unit 606. The power supply unit 606 will help regulate and provide the necessary power to the system. The power supply unit 606 leads to a second power terminal 607.

The control panel 600 includes several air system components in addition to the computer components and electrical components. In the shown embodiment the control panel 600 includes a combination air filter and regulator 608. This will ensure that the air is clean and does not clog the system as well and ensuring that air enters the system at a desired pressure. The air filter and regulator 608 is connected to a manifold assembly 609. The manifold assembly 609 will connect to and run the air components of the system.

Figure 7A:
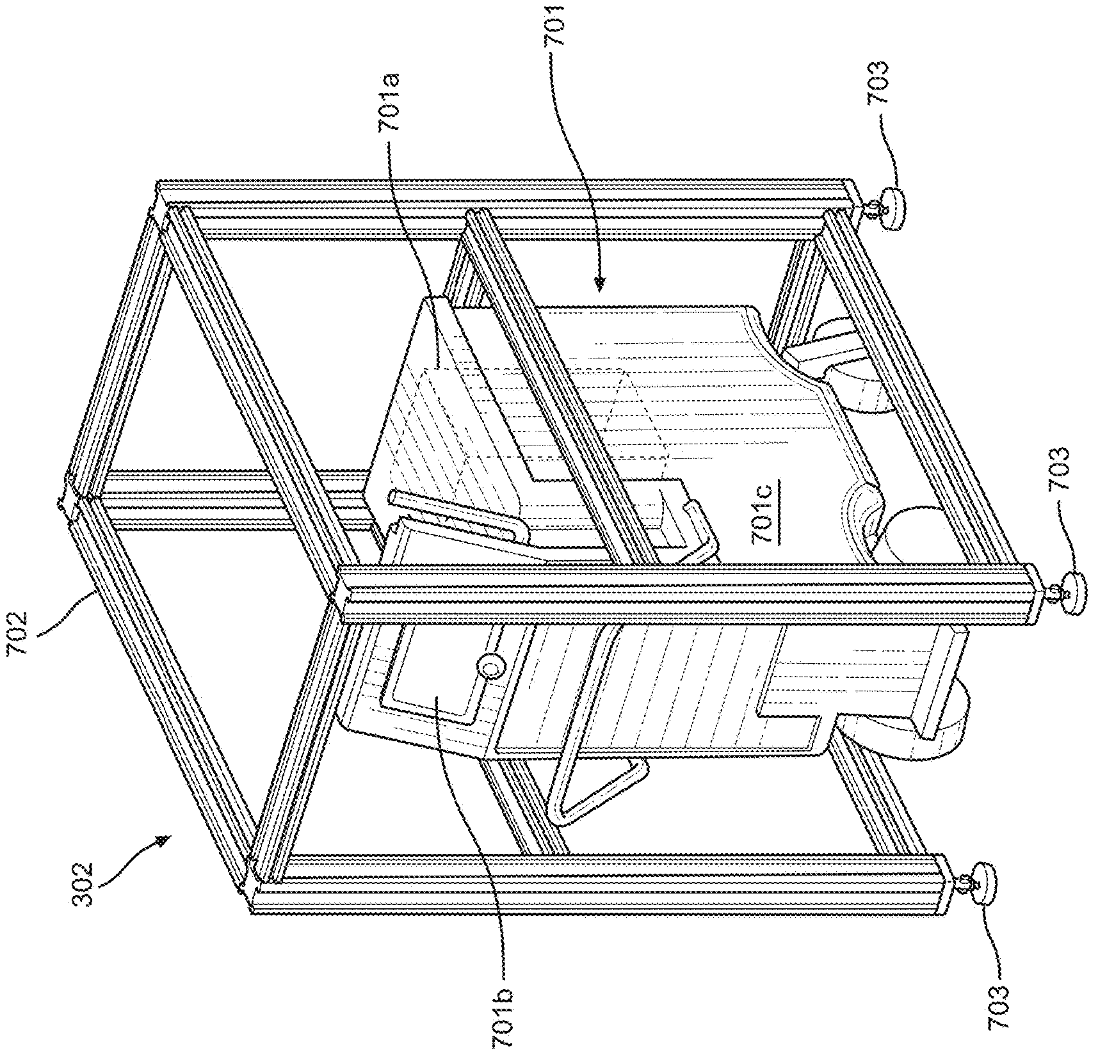
FIG. 7A shows a perspective view of an embodiment of the components housed within a second chamber of the system for cleaning an electronic device with dry ice.
Figure 7B:
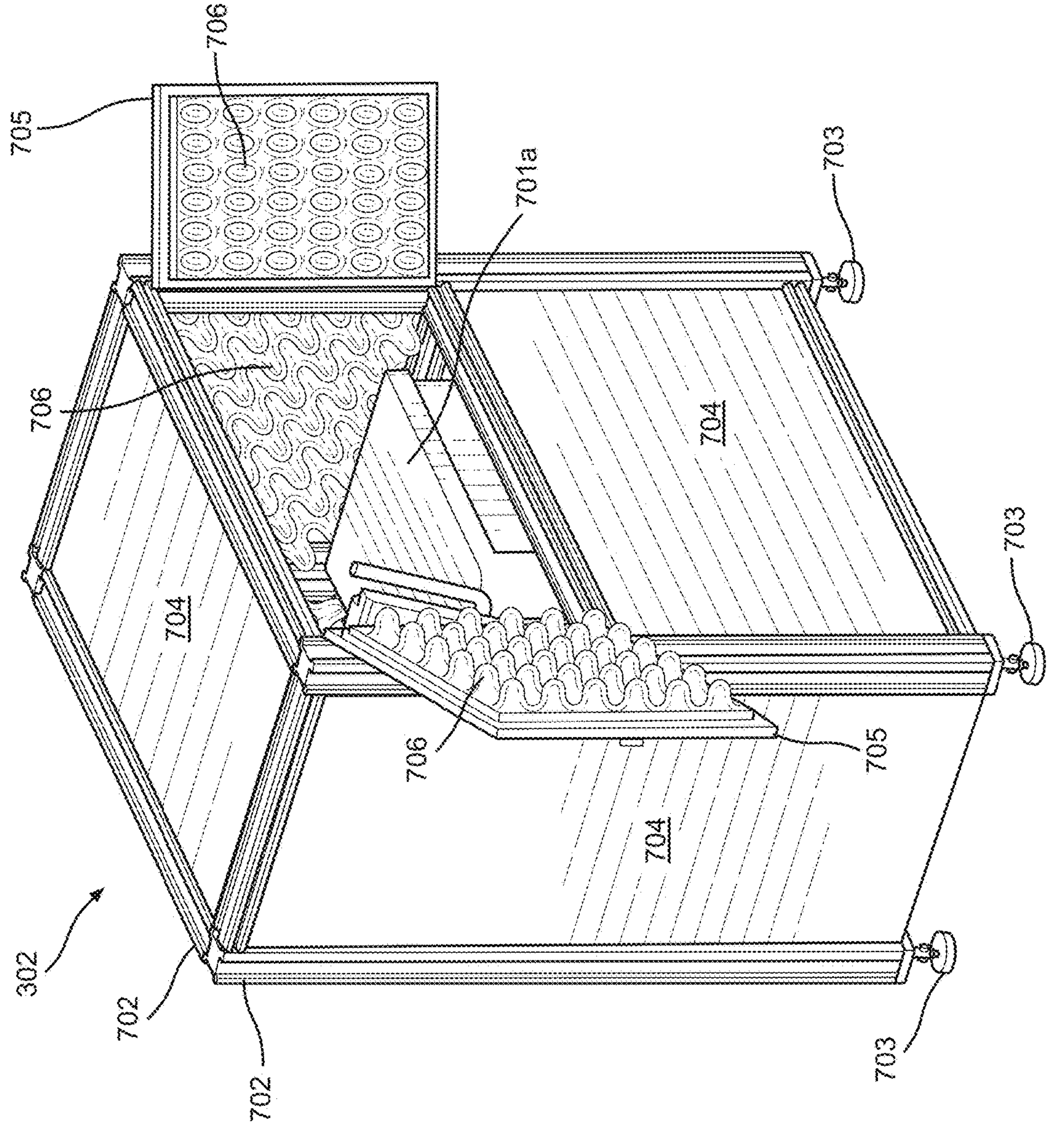
FIG. 7B shows a perspective view of an embodiment of the second chamber of the system for cleaning an electronic device with dry ice.

Referring now to FIG. 7A and FIG. 7B, there are shown perspective views of an embodiment of the components within the second chamber 302 and the second chamber 302 of the system for cleaning an electronic device with dry ice. In the shown embodiment the second chamber 302 will allow for a dry ice machine 701 to be housed therein. In one embodiment the dry ice machine 701 will include a hopper 701*a*, a control screen 701*b*, and a housing 701*c*, which will hold necessary components. These machines are commercially available from various companies including COLD JET®. For the purpose of this disclosure this dry ice machine 701 is capable of controlling the size, flow rate, and pressure of dry ice particles. The dry ice machine 701 sends dry ice from the second chamber 302 to the first chamber 301.

In one embodiment the dry ice machine 701 does not need to be housed within a chamber at all. However, there are several benefits to the second chamber 302 as will become apparent herein. In the shown embodiment the second chamber 302 includes a frame 702. The frame 702 may include a plurality of feet 703 to support the frame. In one embodiment the feet 703 are adjustable which will allow for the second chamber 302 to be leveled.

The frame 702 will allow for walls 704 to be secured thereto. At least one door 705 may also be secured to the frame 702. The door 705 will allow for easy access to the hopper 701*a* and the control panel 701*b* of the dry ice machine 701. In one embodiment sound reduction material 706 is added to the interior of the second chamber 302. In one embodiment the sound reduction material is sound reduction foam. This sound reduction material 706 will reduce sound which is produced by the dry ice machine 701 during the sizing and dispensing process.

Figure 8:
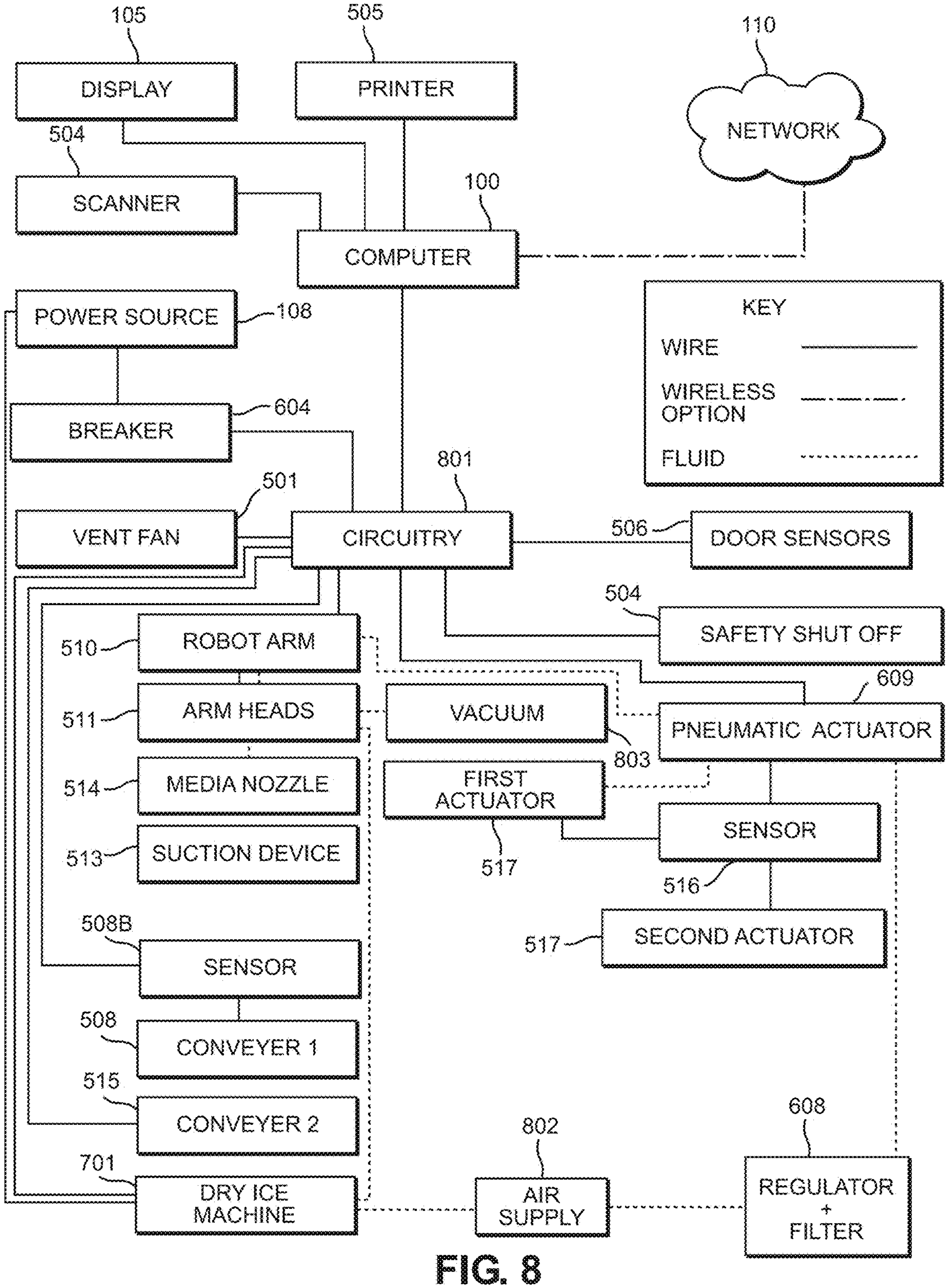
FIG. 8 shows a connection diagram of an embodiment including electrical and fluid connections of the system for cleaning an electronic device with dry ice.

Referring now to FIG. 8, there is shown a connection diagram of an embodiment of the system for cleaning an electronic device with dry ice including electrical and fluid connections. FIG. 8 shows many of the necessary connections for the described embodiment of the system for cleaning an electronic device with dry ice. These connections are described in general terms where one part connects to another. One of ordinary skill in the art will understand that various wires or hoses will be needed to make the connections. Further, one of ordinary skill in the art will understand that other routine items, such as routine circuitry, tube connectors, or wire screws, will be needed to make these connections. Further, this is described as one embodiment where each part is included, however, many of these parts may be optional, and, therefore, the connections may vary.

The KEY shown on FIG. 8 defines the connection types. There is a solid line for wire connections. There is a dashed line for wireless connections. One of ordinary skill in the art will understand that some signal connections shown by a wire may also be wireless connections. Lastly, there are dots used for fluid connections. Fluid connections may be used to transport air, liquids, or an air and particulate mix. For example, cleaning media may be transported through a fluid connection.

Starting with the computer 100 there is a wireless connection shown to the network 110. This will allow for the system to send and receive signals from any desired network 110. The computer 100 may also be connected to several output devices. For example, the computer 100 is connected to a printer 505 and a display 105. The computer 100 is also connected to a scanner 504 for device for inputs. Lastly, the computer 100 may be connected to various other circuitry items. In this embodiment the circuitry is used to facilitate further connections. Much of the circuitry has been described in FIG. 6 and is connected to the control panel 600.

The system receives power from a power source 108 connected to the circuitry. In one embodiment a breaker 604 is added between the power source 108 and the circuitry 801. The circuitry 801 is connected to various safety equipment which is used to better ensure a user's safety. In one embodiment the circuitry 801 is connected to an exhaust fan 501. The circuitry 801 is also connected to door sensors 506.

The door sensors 506 will automatically shut down the system if the doors are opened. The circuitry 801 may also be connected to safety shutoff controls 504 such as buttons.

The circuitry 801 is connected to the robot arm 510. In one embodiment the circuitry 801 is connected directly to the robot arm 510. In another embodiment the circuitry 801 is connected to the robot arm 510 via a robot controller. The robot controller will contain all necessary items and software to properly control the robot arm 510. The robot arm 510 is then connected to at least one tool head 511.

In this embodiment the circuitry 801 is connected to two different conveyors 508 and 515. Both connections may include conveyor controllers which contain all of the necessary components to control each conveyor. The circuitry 801 is connected to a first conveyor 508. In one embodiment the circuitry 801 is connected to a sensor 508*b* which tells the system when to activate the first conveyor 508. The circuitry 801 is also connected to the second conveyor 515. In one embodiment the second conveyor 515 is connected to a second sensor 516.

The circuitry 801 is connected to a manifold assembly 609. The manifold assembly 609 will control various airflows through the system. The manifold assembly 609 is connected to the second sensor 516. The second sensor 516 is attached to the manifold assembly 609 which is connected to a second actuator 517 along with the second conveyor 515.

The circuitry 801 is also connected to the dry ice machine 701. In one embodiment the connection includes a power connection and a data connection. In another embodiment the connection is only a data connection. In this embodiment the dry ice machine 701 has its own power source. The data connection will facilitate control of the dry ice machine 701 by the computer 100 and the display 105.

Moving now to the fluid connections. An air supply 802 is connected to a regulator and filter 608 which is then connected to the manifold assembly 609. In one embodiment the air supply 802 is also connected to the dry ice machine 701. The manifold assembly 609 is connected to the robot arm 510 and the first actuator 517 and the second actuator 517 of the second conveyor 515.

The robot arm 510 is then connected to the at least one tool head 511. The dry ice machine 701 is also fluidly connected to at least one tool head 511. This connection ends in a media nozzle 514 which will allow for the cleaning media to be dispensed from the tool head.

In one embodiment an electronic device is picked up by the robot arm 510 using suction. In one embodiment the suction device 513 is secured to a vacuum 803. In one embodiment the vacuum 803 is connected to the circuitry 801 of the system. In another embodiment the vacuum 803 is a standalone component.

Figure 9:
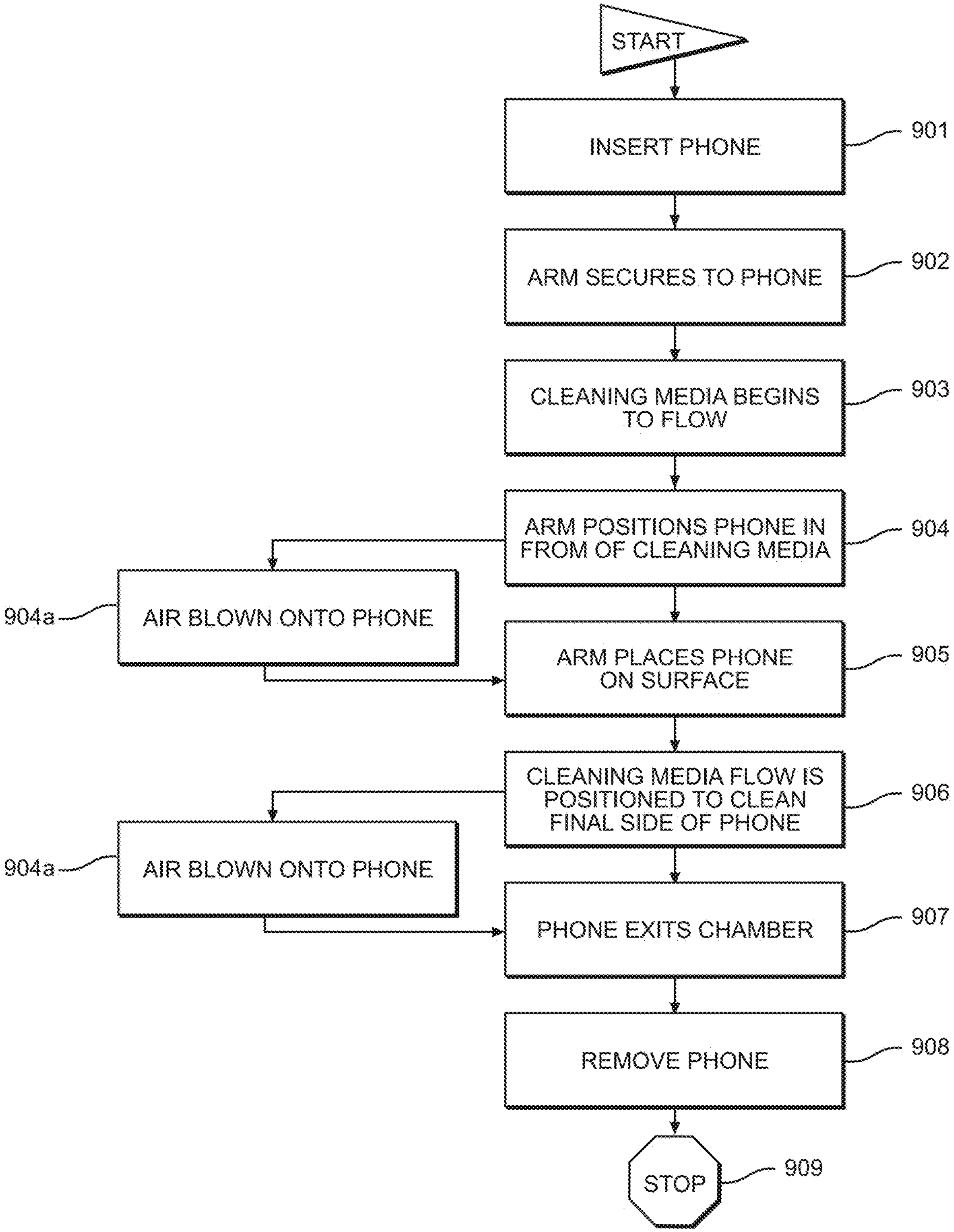
FIG. 9 shows a flow chart of an embodiment of a method for cleaning an electronic device with dry ice.

Referring now to FIG. 9, there is shown a flow chart of an embodiment of the method for cleaning an electronic device 200 with dry ice. The method begins by inserting a desired electronic device into the system 901. The insertion of the electronic device includes at least physically placing the device within the system for cleaning. In many embodiments the electronic device is also electronically placed into the system. See the expansion of this step in FIG. 10 for a detailed explanation.

In the next step the robot arm secures to the device 902. In one embodiment the electronic device begins in a proper location for the robot arm to secure to the device. In another embodiment the electronic device moves to a proper location within the system. Once properly secured cleaning media will begin to flow 903. See FIG. 11 for a detailed description of flowing cleaning media through the system.

The robot arm properly positions the electronic device in front of the flow of cleaning media 904. Depending on the different flow rate of the media and the size of the media the robot arm will place the device at various distances from the nozzle from which the cleaning media is expelled. For example, if an electronic device needs a deeper clean the pressure and flow rate are increased. Further, in various embodiments the angle of the electronic device may change due to cleaning needs.

In some embodiments the positioning of the electronic device includes moving the electronic device in different patterns based on predetermined criteria. For example, a pattern may be determined based upon the type, make, and/or model of the electronic device. The pattern may also be determined based on cleaning type. For example, a light cleaning may have a smaller or faster pattern, whereas a heavier cleaning may require a larger or slower pattern. In some embodiments patterns can be preset and held in the computer then selected based on the criteria discussed above.

In some embodiments this step of the process will clean five surfaces of the electronic device. In one embodiment the surface which the robot arm attached to will not be cleaned. In this example the electronic device is a mobile phone device having six surfaces as described in FIG. 2A and FIG. 2B. However, with only minor modifications, one of ordinary skill in the art will understand how to potentially clean a device with more surfaces by instructing the robot arm to have a different series of movements.

In one embodiment, after the desired surfaces are cleaned, air is blown onto the electronic device 904*a*. In some instances, the dry ice cleaning can leave an amount of moisture on the electronic device; this blast of air will remove the moisture from the device. Other benefits include blowing off any loosened and remaining particulates after the desired surfaces of the electronic device are cleaned.

In one embodiment after the air is blown onto the electronic device 904*a* the robot arm placed the electronic device on a desired surface 905. In another embodiment after the desired surfaces are cleaned the robot arm placed the electronic device on a desired surface 905. In one embodiment the desired surface is a conveyor as described above. In one embodiment the electronic device is placed on the desired surface such that the uncleaned surface is pointing in an upward position. The upward position is a position in which the uncleaned surface can be cleaned by the cleaning media. After the electronic device is placed the final surface is cleaned 906. This step includes properly positioning a nozzle from which cleaning media is expelled. In one embodiment the electronic device is moved in front of the nozzle. In another embodiment the nozzle is moved to the device.

In one embodiment after the electronic device has been fully cleaned or cleaned as desired air is blown on the electronic device 904*a*. In another embodiment no air is blown and after the electronic device has been fully cleaned or cleaned as desired (only certain desired sides may be cleaned), the electronic device will exit the chamber 907. In one embodiment the electronic device automatically exits the chamber. In another embodiment the electronic device needs to be removed by an operator. Once the electronic device exits the chamber 907 the electronic device is removed from the system 908. In one embodiment this step simply involves physically removing this electronic device and the method ends there 909. In another embodiment the removal process is much more detailed and is described in FIG. 12.

Figure 10:
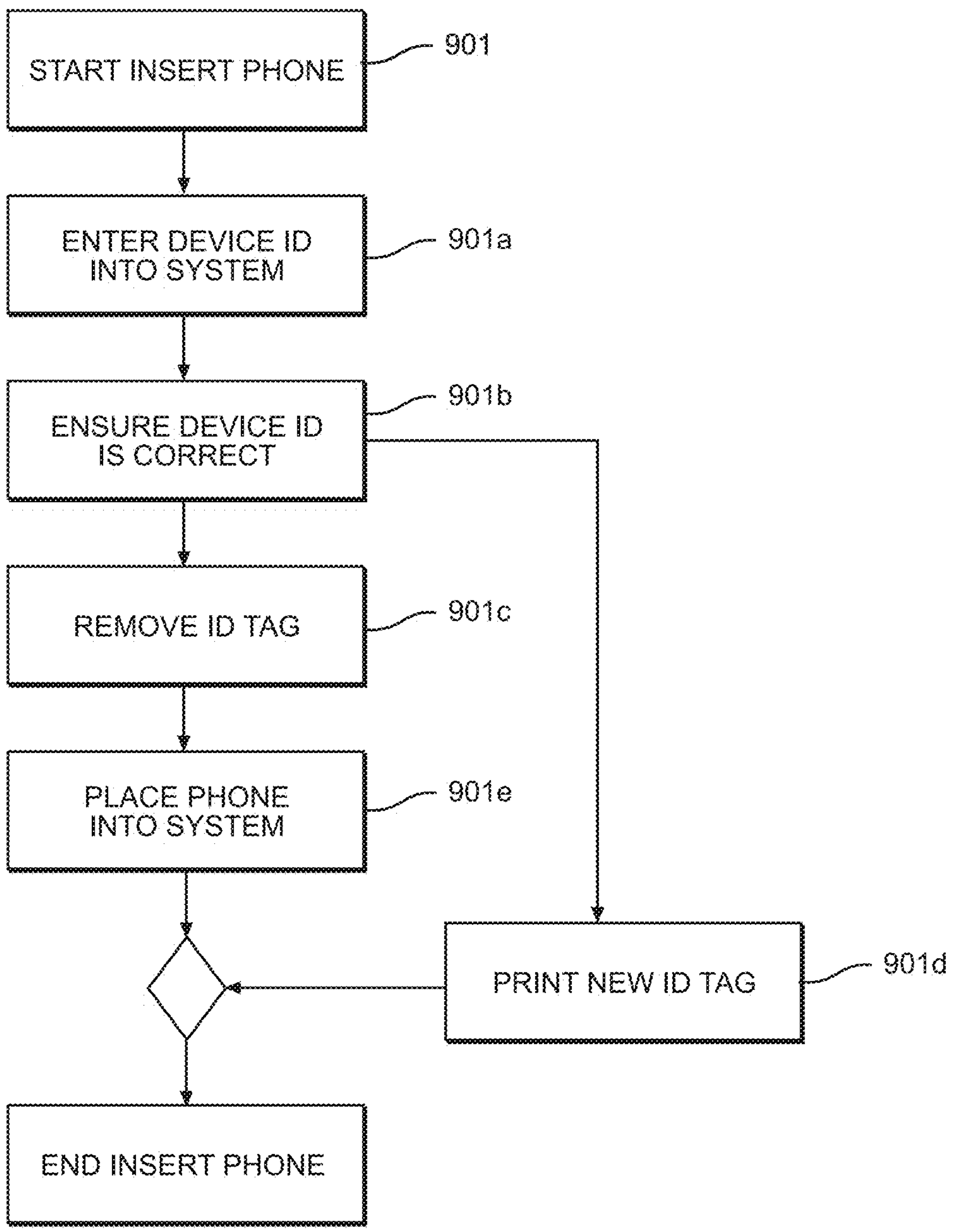
FIG. 10 shows a flow chart of an embodiment of the method for cleaning an electronic device with dry ice, specifically for inserting a device into the system.

Referring now to FIG. 10, there is shown a flow chart of an embodiment of the method for cleaning an electronic device with dry ice, specifically for inserting an electronic device into the system. In one embodiment the insert electronic device 901 step of the method for cleaning an electronic device with dry ice simply includes placing the electronic device into the system. However, in some instances users will want, or need, to track the electronic device. Different tracking systems may be utilized and are intended to be encompassed by the use of tracking ID.

In one embodiment when a device is being tracked, the entering of the electronic device into the system includes entering the device ID into the system 901*a*. This step may be accomplished in several ways. In one embodiment a device ID is physically entered into the system manually via typing or even writing the device ID into a ledger. In one embodiment, the device ID is entered into the system by way of a scanner. In this embodiment the device ID may be placed on a scannable tag or other scannable medium which is secured to the electronic device.

In some embodiments the method includes ensuring that the device ID is proper and matches the device 901*b*. In one embodiment this is done by a user. In another embodiment the system is configured to check the device ID. After confirming the device ID and the device matches the user may remove the ID tag 901*c*. In one embodiment the system will print a new ID tag 901*d*. This will allow for a new ID tag to be placed on the device after cleaning. In one embodiment the old ID tag is removed and most likely discarded or cannot properly be reattached. In another embodiment where the ID tag is not removed the cleaning process will either remove or destroy the ID tag.

The electronic device is then physically placed into the system 901*e*. In one embodiment the user must physically place the electronic device within the first chamber in a position to be cleaned. In another embodiment the system is configured to place the electronic device in a proper position for cleaning. For example, the electronic device may be placed on a conveyor as described above which will then properly position the device.

Figure 11:
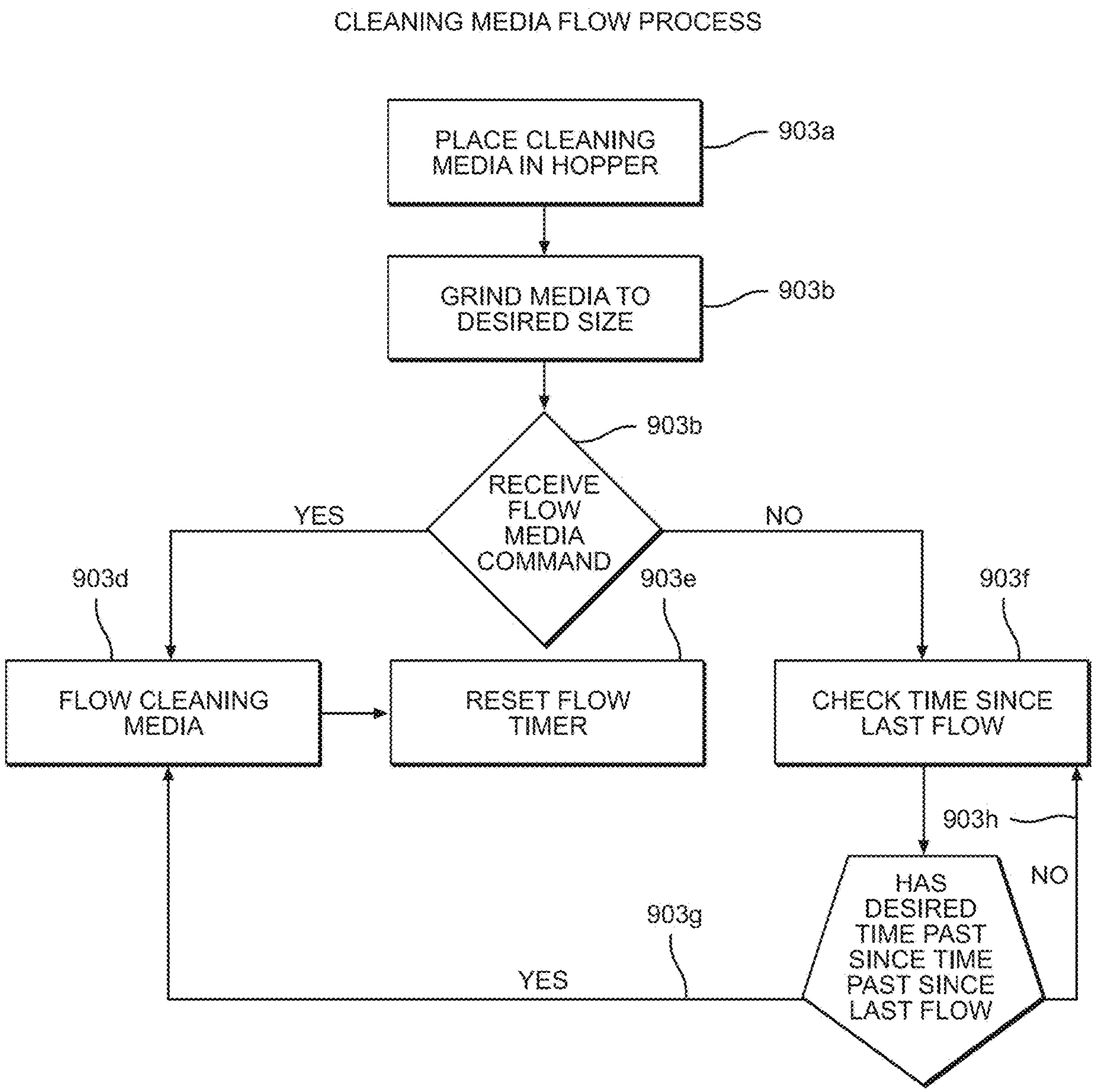
FIG. 11 shows a flow chart of an embodiment of the method for cleaning an electronic device with dry ice, specifically for the flow of cleaning media.

Referring now to FIG. 11, there is shown a flow chart of an embodiment of the method for cleaning an electronic device with dry ice, specifically for the flow of cleaning media. In many embodiments the flow of cleaning media will begin by placing cleaning media into the hopper 903*a*, which was described above. The media will be ground and properly sized 903*b*, by the media machine described above. In one embodiment the cleaning media is sent through the system and expelled through at least one nozzle as described above, or the cleaning media flows 903*d*.

In another embodiment, however, the method included a process of turning the media flow off and on. In this process the method includes determining if a flow media command has been given to the media machine 903*c*. If the command has been given the media will flow 903*d*. In one embodiment when the media is flowed, the system will reset a media flow timer 903*e*. In another embodiment the cleaning media will flow for the desired time then cease.

In the embodiment where the flow time is reset 903*e* the system will also determine if the flow timer has expired 903*f*. In this embodiment the flow timer is set to a time as desired. The time should be set to a time which prevents the cleaning media from freezing up and blocking the flow tubes. If the timer has expired 903*g* the system will send a flow cleaning media signal 903*d* in order to prevent the cleaning media from remaining sedentary for too long. If the timer has not expired 903*h* the system will revert to waiting for the flow command to be issued.

Figure 12:
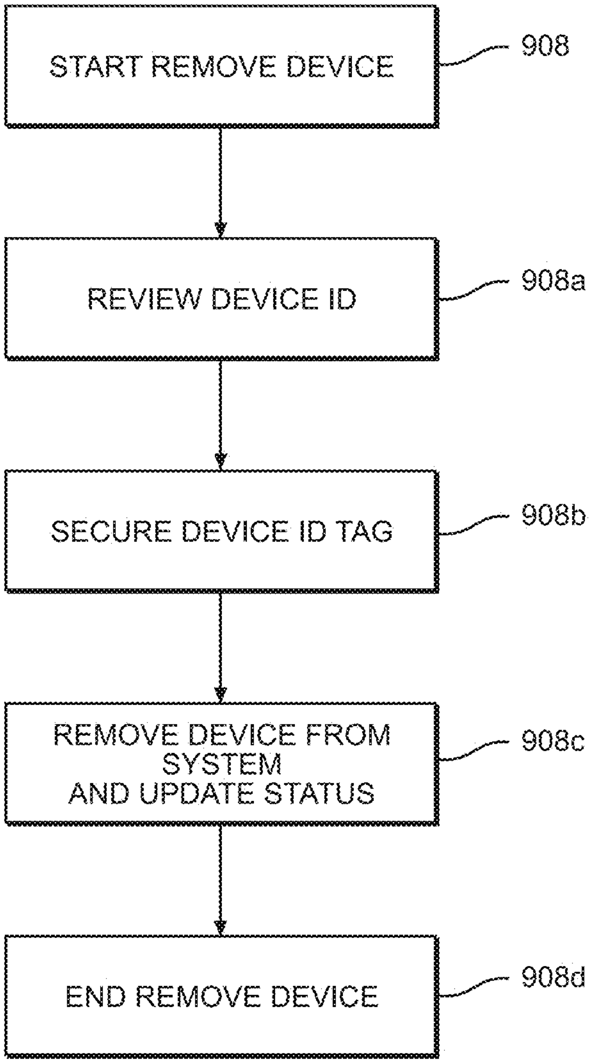
FIG. 12 shows a flow chart of an embodiment of the method for cleaning an electronic device with dry ice, specifically for removing the device from the system.

Referring now to FIG. 12, there is shown a flow chart of an embodiment of the method for cleaning an electronic device with dry ice, specifically for removing the device from the system. In one embodiment where the electronic device is only physically placed within the system for cleaning, the removal of the device involves only physically removing the device from the system after it is cleaned. In some embodiments the electronic device was only placed physically in the system to be cleaned but needs to be tracked and entered in a device system upon completion for tracking or other purposes. In yet a further embodiment the electronic device was entered in the device system prior to cleaning and now needs to either be removed or have the device system updated with the device's status.

In one embodiment the remove device process 908 begins once the electronic device is removed from the first chamber as described above. The device ID may then be reviewed 908*a*. In one embodiment a user will check the device ID. In another embodiment the system is configured to check the device ID. After the device ID has been confirmed a device ID tag will be applied to the device 908*b*. In some embodiments the creation of the device ID tag will remove the device from the device system or update the devices status 908*c*. In one embodiment the electronic device is physically removed from the cleaning system at this stage and the method ends 908*d*. In another embodiment the electronic device was already physically removed from the cleaning system and the method ends 908*d* after the device system is properly updated.

It is therefore submitted that the methods, systems, and devices have been shown and described in what is considered the most practical and preferred embodiments along with specific examples. It is recognized, however, that departures may be made within the scope, and these present examples are not intended to be limiting. One of ordinary skill the art will be able to discern that obvious modifications can be made without departing from the scope or spirit.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Similarly, it is to be realized that it is not intended for any method set forth herein to be construed as requiring that its steps be performed in a specific order, unless otherwise set forth in the claims.

Therefore, the foregoing is considered as illustrative only of the principles of the disclosure. Further, since numerous modifications and changes will readily occur to those skilled in the art, it is not desired to limit the invention to the exact construction and operation shown and described, and accordingly, all suitable modifications and equivalents may be resorted to, are deemed to fall within.

What is claimed:

1. A method for cleaning an electronic device with dry ice, the method comprising:

providing a first robotic arm, having interchangeable tool heads comprising a first tool head and a second tool head;

placing an electronic device in a first location;

securing the electronic device to the first tool head of the first robotic arm;

cleaning the electronic device by removing the electronic device from the first location to a second location and applying dry ice to five sides of the electronic device via a dry ice nozzle, wherein the dry ice nozzle is secured to the second tool head and the second tool head is removably secured to a tool head mount positioned adjacent to the first robotic arm;

wherein the first robotic arm moves the electronic device into a stream of dry ice sprayed by the dry ice nozzle which remains stationary in the tool head mount;

exchanging the tool heads on the first robotic arm, wherein the first robotic arm exchanges the first tool head for the second tool head;

applying dry ice to a final side of the electronic device using the first robotic arm and the second tool head; and applying air to each side of the electronic device.

2. The method of claim 1, further comprising entering the electronic device into a tracking system.

3. The method of claim 1, wherein the electronic device is moved into the first location via a conveyor.

4. The method of claim 1, further comprising determining a flow rate and particle size of the dry ice to be applied.

5. The method of claim 1, further comprising determining a type of electronic device.

6. The method of claim 1, further comprising selecting a cleaning pattern based on a cleaning type desired.

7. The method of claim 5, further comprising determining a cleaning pattern based on the type of electronic device.

8. A method for cleaning an electronic device with dry ice, the method comprising:

providing a first robotic arm, having interchangeable tool heads comprising a first tool head and a second tool head;

placing an electronic device in a first location, wherein the first location is on a first conveyor;

removing the electronic device from the first conveyor via the first robotic arm, wherein the first robot arm has the first tool head secured thereto;

cleaning the electronic device by applying dry ice to each side of the electronic device via a dry ice nozzle, wherein the dry ice nozzle is secured to the second tool head and the second tool head is removably secured to a tool head mount positioned adjacent to the first robotic arm;

wherein the first robotic arm moves the electronic device into a stream of dry ice sprayed by the dry ice nozzle which remains stationary in the tool head mount;

applying air to five sides of the electronic device;

placing the electronic device on a second conveyor such that a cleaned surface of the electronic device is placed on the second conveyor;

exchanging tool heads on the first robotic arm, wherein the first robotic arm exchanges the first tool head for the second tool head;

applying, for a second time, dry ice to the electronic device using the first robotic arm and second tool head, such that a final surface of the electronic device is cleaned.

9. The method of claim 8, wherein the electronic device is secured to the first robotic arm via the first tool head, wherein the first tool head comprises a suction device.

10. The method of claim 8, further comprising applying, for a second time, air to the electronic device.

11. The method of claim 8, further comprising entering the electronic device into a tracking system.

12. The method of claim 8, further comprising determining a flow rate and particle size of the dry ice to be applied.

13. The method of claim 8, further comprising determining a type of electronic device.

14. The method of claim 13, further comprising determining a cleaning pattern based on the type of electronic device.

* * * * *